United States Patent
Sella et al.

(10) Patent No.: US 9,045,095 B2
(45) Date of Patent: Jun. 2, 2015

(54) SECURITY FOR A WIRELESS ECU VEHICLE SYSTEM

(71) Applicant: Cisco Technology Inc., San Jose, CA (US)

(72) Inventors: Yaron Sella, Beit Nekofa (IL); Chaim Shen-Orr, Haifa (IL)

(73) Assignee: CISCO TECHNOLOGY INC., San Jose, CA (US)

( * ) Notice: Subject to any disclaimer, the term of this patent is extended or adjusted under 35 U.S.C. 154(b) by 0 days.

(21) Appl. No.: 14/027,611

(22) Filed: Sep. 16, 2013

(65) Prior Publication Data

US 2014/0172188 A1 Jun. 19, 2014

(30) Foreign Application Priority Data

Dec. 16, 2012 (IL) .......................................... 223679

(51) Int. Cl.
| | |
|---|---|
| *B60R 16/023* | (2006.01) |
| *H04W 12/04* | (2009.01) |
| *H04L 9/08* | (2006.01) |
| *H04W 4/04* | (2009.01) |
| *H04L 29/08* | (2006.01) |

(52) U.S. Cl.
CPC ............ *B60R 16/023* (2013.01); *H04L 9/0819* (2013.01); *H04W 12/04* (2013.01); *H04W 4/046* (2013.01); *H04L 67/12* (2013.01)

(58) Field of Classification Search
CPC ... G06F 21/6236; H04L 9/0819; H04W 12/04
USPC .............................................. 701/1; 713/171
See application file for complete search history.

(56) References Cited

U.S. PATENT DOCUMENTS

| | | | |
|---|---|---|---|
| 2004/0139320 A1 | 7/2004 | Shinohara | |
| 2005/0226420 A1 | 10/2005 | Makela et al. | |
| 2007/0168664 A1 | 7/2007 | Goodman et al. | |
| 2008/0005564 A1 * | 1/2008 | Agarwal ........................ | 713/171 |
| 2010/0296478 A1 * | 11/2010 | Hogenmueller et al. ...... | 370/330 |
| 2012/0200151 A1 * | 8/2012 | Obayashi et al. .............. | 307/9.1 |

OTHER PUBLICATIONS

Ahmed Mohiuddin, "Intra-Vehicular Wireless Networks," (IEEE Globecom Workshops, Nov. 30, 2007).

* cited by examiner

*Primary Examiner* — Mary Cheung
*Assistant Examiner* — Yuen Wong
(74) *Attorney, Agent, or Firm* — Husch Blackwell LLP

(57) ABSTRACT

A secure wireless vehicle control system includes a power source installed in a vehicle and a plurality of electronic control units (ECUs) operative to control the operation of components of the vehicle, where each of the ECUs is connected to the power source via electrical wiring, configured with at least a communications unit for receiving security information via the electrical wiring, and also configured with a wireless transceiver operative to use the security information to secure wireless transmission. An ECU includes a wired connection to a vehicle's power source, a communications unit operative to at least receive security information via the wired connection, and a wireless transceiver operative to communicate with at least one other ECU, where the wireless transceiver is configured to use the security information to secure communications with the at least one other ECU. A method for securing wireless communications for an ECU includes receiving security information on a communications unit via a wired connection to a vehicle's power source, and using the security information to secure the wireless communications.

7 Claims, 1 Drawing Sheet

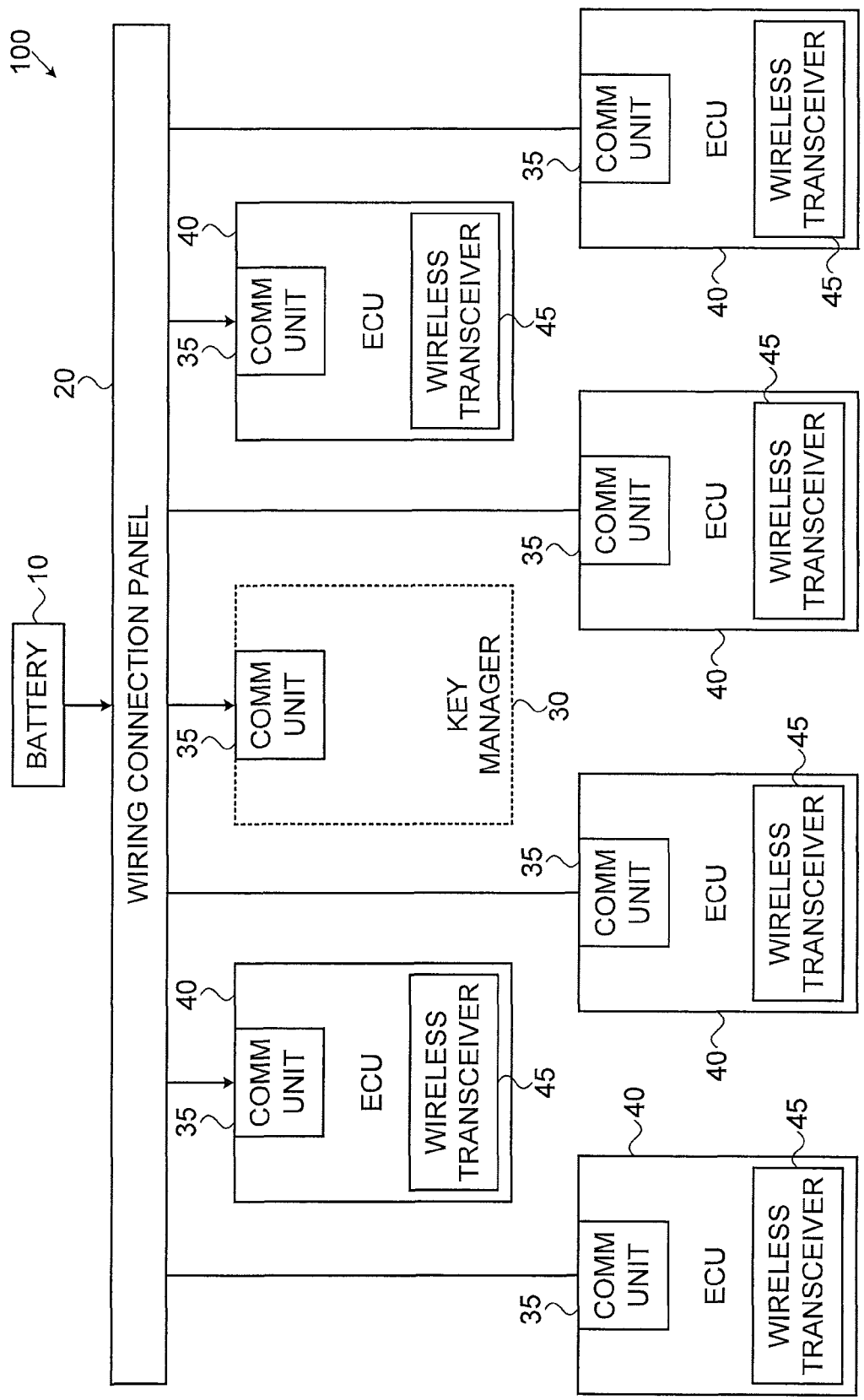

SECURITY FOR A WIRELESS ECU VEHICLE SYSTEM

FIELD OF THE INVENTION

The present invention relates in general to wireless environments for vehicles, and particularly, but not exclusively, to security for electronic control units (ECUs).

BACKGROUND OF THE INVENTION

The following references are believed to represent the known state of the art:

Globecom Workshops, 2007 IEEE, vol., no., pp. 1-9, 26-30 Nov. 2007, "Intra-vehicular Wireless Networks," Ahmed, M. et al;

U.S. Patent Application Publication 2007/168664A "Data encryption/decryption for data storage drives," of Goodman et al;

U.S. Patent Application Publication 2004/139320A "Radio communication system, shared key management server and terminal" of Shinohara; and U.S. Patent Application Publication 2005/226420A "Method and system in a digital wireless data communication network for arranging data encryption and corresponding server" of Makela et al.

SUMMARY OF THE INVENTION

The present invention, in certain embodiments thereof, seeks to provide improved security for wireless vehicle control systems.

There is thus provided in accordance with an embodiment of the present invention a secure wireless vehicle control system including a battery installed in a vehicle, and a plurality of electronic control units (ECUs) operative to control the operation of components of the vehicle, where each of the ECUs is connected to the battery via electrical wiring, configured with at least a communications unit for receiving security information via the electrical wiring, and also configured with a wireless transceiver operative to use the security information to secure wireless transmission.

There is also provided in accordance with an embodiment of the present invention a vehicle electronic control unit (ECU) including a wired connection to a vehicle's battery, a communications unit operative to at least receive security information via the wired connection, and a wireless transceiver operative to communicate with at least one other ECU, where the wireless transceiver is configured to use the security information to secure communications with the at least one other ECU.

There is also provided in accordance with an embodiment of the present invention a method for securing wireless communications for a vehicle electronic control unit (ECU), the method including receiving security information on a communications unit via a wired connection to a vehicle's battery, and using the security information to secure the wireless communications.

Further, in accordance with an embodiment of the present invention, the security information is at least one of a security key and a nonce.

Still further, in accordance with an embodiment of the present invention, the communications unit supports a protocol for communication over electric power lines.

Additionally, in accordance with an embodiment of the present invention, the power source is a vehicle battery.

Moreover, in accordance with an embodiment of the present invention, the power source is a generator powered by a vehicles engine.

Further, in accordance with an embodiment of the present invention the system also includes a key manager connected to the battery by the electrical wiring and operative to transmit the security information via the electrical wiring.

Still further, in accordance with an embodiment of the present invention each of the ECUs are configurable to transmit the security information to be received by other ECUs.

BRIEF DESCRIPTION OF THE DRAWINGS

The present invention will be understood and appreciated more fully from the following detailed description, taken in conjunction with the drawings in which:

FIG. 1 is a simplified schematic illustration of a secure wireless ECU vehicle system, constructed and operative in accordance with an embodiment of the present invention.

DETAILED DESCRIPTION OF AN EMBODIMENT

Modern motor vehicles typically have a multiplicity of embedded systems called electronic control unit (ECUs) configured to control one or more of their component electrical systems or subsystems. For example, ECUs may be used to control a vehicle's engine, transmission, brakes, suspension, etc. A vehicle may therefore be typically configured with dozens of such ECUs to control its operation. ECUs may typically communicate between themselves using wired buses. The cost of deploying the metal wires required for these buses may be significant: component materials of the wiring, such as for example, copper, may be expensive, the wiring process may add to the time and resources required to build the car, service and repair may be labor intensive, and the wires may also increase the vehicle's weight, thereby impacting overall performance.

One possible alternative to wired buses may be wireless communication. Each communicating ECU may be equipped with a wireless transceiver for sending and receiving information to other similarly equipped ECUs.

However, such wireless communication may increase exposure to attacks by hackers and/or random interference from other wireless communications. It may therefore be appreciated that a wireless based configuration may require additional security measures.

In accordance with some embodiments of the present invention, communication between ECUs in the vehicle may be secured by a set of security keys common to the relevant ECUs, which may presumably be unknown to the outside world. This common set of security keys may be used to secure the wireless communication by any suitable method such as known in the art, such as, for example, signing and/or encryption. Groups of ECUs within a specific vehicle may share common security keys and use them to secure their communications. Any communication received that may not be secured using the keys, such as hacking attempts and/or random interference, may be ignored by the ECUs and therefore may not affect the vehicle's operation.

However, while a key based security system may provide relatively secure wireless communication, implementing such a system may still require coordination of the distribution of the security keys in a secure manner. Accordingly, a key based wireless communication system may suffer from a systemic weakness: key distribution may be required to secure the wireless communications, but that distribution may of a necessity be performed via the same generally non-secure wireless communication.

It will be appreciated that most ECUs may require an outside power source for operation, typically the vehicle's battery. The inventor/s of the present patent application have realized that the electrical wiring that may connect each of the ECUs to the vehicle's battery may be leveraged to provide a secure distribution path for security keys in an otherwise wireless communication environment. While communication over power lines may tend to be relatively slow and/or subject to inference from power surges, most sensitive security-related information may be relatively small in size and may be sent relatively infrequently, for example, when the engine is started. Accordingly, even though a vehicle's electrical wiring may be an inappropriate platform for ongoing communication between a vehicle's ECUs, it may be sufficient for a relatively infrequent exchange of security keys.

Reference is now made to FIG. 1 which illustrates a secured ECU wireless communication system 100, constructed and operative in accordance with an embodiment of the present invention. System 100 may comprise a plurality of ECUs 40 connected to battery 10 via wiring connection panel 20. It will be appreciated that the depiction of battery 10 and wiring connection panel 20 may be exemplary. In practice, system 100 may be implemented using any suitable car battery and connection schemes such as are commonly available, including, for example, direct connection of some or all ECUs 40 to battery 10. It will also be appreciated that in some configurations of system 100, battery 10 may be replaced by any suitable power source used to provide electricity to ECUs 40. For example, system 100 may also be configured such that ECUs 40 receive electricity from an electrical generator powered by the vehicle's internal combustion engine. It will further be appreciated that ECUs 40 may represent a multiplicity of various ECUs that may be employed to operate and control a vehicle in which system 100 may be implemented. System 100 may also comprise key manager 30 which may also be connected to battery 10 via connection panel 20. Key manager 30 may be an ECU that may be configured to coordinate and manage the distribution of security keys in system 100.

Key manager 30 and ECUs 40 may each comprise a communications unit 35 that may be configured to provide communications over electric wiring, such as the leads from key manager 30 and ECUs 40 to panel 20. Communications units 35 may use any suitable standard to communicate with each other over electrical wiring, such as, for example, G.hn (ITU standards G.9960, G.9961), power line carrier communication (PLCC), digital power line carrier (DPLC), UPB (universal powerline bus), distribution line carrier (DLC), PowRline intelligent metering evolution (PRIME), and/or G3-PLC (ITU standard G.9903). It will be appreciated that depending on the standard used, key manager 30 and/or one or more ECUs 40 may be configured to provide network management functionality as may be required according to the communications standard to be used.

ECUs 40 may also comprise wireless transceivers 45 for communication between themselves as required for the operation of the vehicle. Wireless transceivers 45 may use any suitable standard to communicate with each other, such as, for example, RFID, Bluetooth, ZigBee or UWB. It will be appreciated that communications units 35 and wireless transceivers 45 may be depicted as separate units in the interests of clarity. However, in practice, the functionality of units 35 and transceivers 45 may or may not be implemented within the context of a single unit.

Key manager 30 may be configured to generate one or more security keys upon vehicle startup and distribute them as required to ECUs 40 via communications units 35. The distributed security keys may then be used to secure communications between the various ECUs 40 via transceivers 45. It will be appreciated that the ECUs 40 may be grouped according to any suitable criteria and that key manager 30 may be configured to generate the security keys on a per group basis to add an additional layer to the overall security of system 100.

In accordance with some embodiments of the present invention, some or all of the security keys may be "hard coded" in ECUs 40 at the time of vehicle production. In such a case, key manager 30 may not be required to generate and distribute security keys each time the vehicle is turned on. However, key manager 30 may be used to update a new or replacement ECU 30 when it may be installed in system 100. Key manager 30 may securely send (via communications units 35) a newly installed ECU 40 any security keys that it may require in order to communicate with other ECUs 40.

In accordance with some embodiments of the present invention, key manager 30 may also be configured to broadcast a random nonce to each ECU 40 upon vehicle startup. Random nonces may typically be used in order to prevent replay attacks. Accordingly, the random nonce must be sent securely, such that outsiders cannot force it to be a value of their choice. Sending the nonce over electrical wiring via communications units 35 instead of broadcasting the nonce "in the clear" via transceivers 45 may prevent the nonce from being intercepted.

System 100 may alternatively be configured without key manager 30. It will be appreciated that while it may be convenient to use a central entity such as key manager 30 for keys coordination purposes and/or nonce distribution, it may not be required for all implementations of system 100. For example, system 100 may be configured to use distributed protocols to achieve the same goals. Each ECU 40 may broadcast a random nonce, thereby yielding a set of nonces n1, n2, n3 . . . A final nonce may be computed as a hash of all the nonces (n1, n2, n3 . . . ) that were broadcast during a given predefined period, for example, 100 milliseconds.

It will therefore be appreciated that the present invention may disclose a system and method for using power lines for keys/nonce coordination, regardless of whether or not system 100 may be configured with key manager 30.

As discussed hereinabove, communications over electrical wiring may be subject to interference from power surges. In accordance with some embodiments of the present invention, system 100 may be configured to use acknowledgement protocols to ensure that ECUs 40 have correctly received the security keys transmitted by key manager 30. For example, ECUs 40 may send an acknowledgement message (ACK) to key manager 30 upon receipt of security information such as a security key or nonce. The ACK may be sent via communications unit 35, or alternatively via wireless transceiver 45 if key manager 30 is also configured with a wireless transceiver 45. ECUs 40 may use the received security information to encrypt and sign the ACK before transmission. If key manager 30 does not receive a properly formatted ACK from each relevant ECU 40, it may resend the security information. Alternatively, ECU 40 may send the received value of the security information back to key manager 30 via communications unit 45 to ensure that the correct value was received and not corrupted by interference.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub combination.

It will be appreciated by persons skilled in the art that the present invention is not limited by what has been particularly shown and described hereinabove. Rather the scope of the invention is defined by the appended claims and equivalents thereof:

What is claimed is:

1. A method for securing wireless communications for a multiplicity of electronic control units (ECUs) installed in a vehicle, the method comprising:
   connecting a communication unit on each of said ECUs via electrical wiring to a power source of said vehicle, wherein said ECUs are configured to control one or more of electrical component systems and subsystems of said vehicle;
   configuring one of said ECUs as a key manager;
   generating at least one key by said key manager;
   distributing said at least one key from said key manager via said electrical wiring to other said ECUs from among said multiplicity of ECUs; and
   applying said distributed at least one key to secure said wireless communications between at least two of said multiplicity of ECUs, wherein said wireless communications are performed via wireless transceivers on said at least two ECUs.

2. The method according to claim 1 wherein said power source is a vehicle battery.

3. The method according to claim 1 wherein said power source is a generator powered by said vehicle's engine.

4. The method according to claim 1 wherein said distributing comprises distributing said at least one key via said electrical wiring from one of said ECUs to at least another of said ECUs.

5. The method according to claim 1 wherein said communications unit supports a protocol for communication over electric power lines.

6. The method according to claim 1 wherein said generating is performed upon startup of said vehicle.

7. The method according to claim 1 wherein said one or more of electrical component systems and subsystems of said vehicle is at least one of engine, transmission, brakes, or suspension.

* * * * *